United States Patent [19]

Cazenave

[11] 4,118,521
[45] Oct. 3, 1978

[54] ISOLATION OF AN AROMATIC FRACTION OF COFFEE

[75] Inventor: Paul Cazenave, Dieppe, France

[73] Assignee: Societe d'Assistance Technique pour Produits Nestle, S.A., Lausanne, Switzerland

[21] Appl. No.: 703,980

[22] Filed: Jul. 9, 1976

Related U.S. Application Data

[63] Continuation of Ser. No. 623,055, Oct. 16, 1975, abandoned.

[30] Foreign Application Priority Data

Nov. 11, 1974 [CH] Switzerland ............ 15042/74

[51] Int. Cl.² ............ A23F 3/00; A23F 5/00
[52] U.S. Cl. ............ 426/651; 426/386; 426/430; 426/489; 426/650
[58] Field of Search ............ 426/386, 387, 432, 594, 426/442, 492, 595, 651, 430, 489, 650; 260/236.5, 236.6; 203/67, 68, 70

[56] References Cited

U.S. PATENT DOCUMENTS

| 1,292,458 | 1/1919 | Hamor et al. | 426/386 |
| 1,367,724 | 2/1921 | Trigg | 426/387 |
| 2,563,233 | 8/1951 | Gilmont | 426/386 |
| 3,155,523 | 11/1964 | Reich | 426/386 X |
| 3,244,530 | 4/1966 | Byer et al. | 426/492 |
| 3,361,571 | 1/1968 | Nutting et al. | 426/428 X |
| 3,649,296 | 3/1972 | Friedman et al. | 426/594 |
| 3,712,822 | 1/1973 | Meade | 426/429 X |
| 3,821,447 | 6/1974 | Jasovsky | 426/386 |

FOREIGN PATENT DOCUMENTS

| 479,209 | 10/1953 | Canada | 426/387 |
| 614,139 | 12/1948 | United Kingdom | 426/386 |

*Primary Examiner*—Frank Sever
*Attorney, Agent, or Firm*—Watson, Leavenworth, Kelton & Taggart

[57] ABSTRACT

A process for isolating an aromatic coffee fraction from an aqueous medium containing said fraction, which comprises contacting the aqueous medium with an organic solvent which is an azeotropic mixture capable of boiling at a temperature below about 50° C of (a) at least one non-aromatic hydrocarbon and (b) at least one non-aromatic halogenated hydrocarbon or an ether and recovering a solvent phase containing the aromatic fraction.

9 Claims, No Drawings

ISOLATION OF AN AROMATIC FRACTION OF COFFEE

This is a continuation of application Ser. No. 623,055, filed Oct. 16, 1975, is now abandoned.

This invention relates to a process for isolating an aromatic coffee fraction, to the aromatic fraction obtained by this process and to its use.

After they have been extracted from their natural medium, coffee aromas are fragile entities which are difficult to preserve for prolonged periods in the presence of water. It is for this reason that, in the majority of processes for isolating aromatic coffee fractions where these fractions are converted into aqueous solutions or come into contact with high levels of moisture, the fractions are immediately extracted with a suitable liquid, such as an organic solvent, an oil, etc. However, it has been found that, even if the liquid containing said fractions is carefully dried, the fractions deteriorate rapidly, even at low temperatures and also irrespective of the concentration of these fractions in the liquid. Thus, a coffee aroma in the form of a 20% solution in methylene chloride will not keep for more than a few days, even at 20° C and in the absence of light. Attempts have been made to eliminate this acute instability of volatile coffee fractions by combining the extracts obtained with solvents of different polarity or by using mixtures of solvents for extraction. The stability of the volatile fractions would not appear to be greatly improved.

By contrast, the present invention enables volatile coffee fractions of outstanding stability to be obtained. The present invention relates to a process for isolating an aromatic fraction of coffee from an aqueous medium containing said fraction, which comprises contacting the aqueous medium with an organic solvent which is an azeotropic mixture capable of boiling at a temperature below about 50° C of (a) at least one non-aromatic hydrocarbon and (b) at least one non-aromatic halogenated hydrocarbon or an ether and recovering a solvent phase containing the aromatic fraction.

The present invention also relates to a process such as defined above, in which the aromatic fraction collected in the axeotropic mixture is concentrated by elimination of this azeotropic mixture, more especially by distillation.

Finally, the invention relates to the aromatic fraction thus obtaned and to its use as an aromatising agent.

It is known that an azeotropic mixture, or azeotrope, is a mixture which, under a given pressure, behaves in the same way as a pure substance and, in particular, has a fixed boiling point $P_E$. According to the invention, the azeotropic mixture has a boiling point below about 50° C. Thus, in cases where the process is carried out under atmospheric pressure, the constituents of this azeotropic mixture are compounds of relatively low molecular weight. According to the invention, suitable non-aromatic hydrocarbons are those containing from 4 to 7 carbon atoms; suitable non-aromatic halogenated hydrocarbons are methylene chloride, ethyl chloride, isopropyl chloride, chloroform, freon 12 (dichlorodifluoromethane), freon 11 (trichlorofluoromethane), freon 113 (trichlorotrifluoroethane); suitable ethers are diethyl ether, ethyl isopropyl ether, diisopropyl ether, furan (a cyclic ether), providing these compounds are capable of forming, with a non-aromatic hydrocarbon, an azeotrope with a boiling point below about 50° C and insoluble in water. In addition, the azeotrope may be a more complex mixture than a simple binary mixture. Some suitable azeotropic mixtures are shown by way of example below:

| Constituents | Proportions by volume | $P_E$(760 mm Hg) |
|---|---|---|
| pentane/methylene chloride | 68–32 | 30° C |
| pentane/isopropyl chloride | 58–42 | 30.5° C |
| pentane/freon 113(trichlorotrifluoroethane) | 94–6 | 36° C |
| pentane/diethyl ether | 20–80 | 32° C |
| pentane/methylene chloride/diethyl ether | 34.5–3.5–62 | 33° C |

It is obvious that the process according to the invention may also be carried out with azeotropic mixtures which have a boiling point below 50° C under a pressure different from atmospheric pressure, the constituents of this azeotropic mixture having to be selected accordingly. For example, if the process is carried out under reduced pressure, the constituents of the azeotrope may be selected from compounds of relatively higher molecular weight. Conversely, if the process is carried out under pressure, the constituents of the azeotrope may be selected from compounds of very low molecular weight, for example from compounds that are gaseous under ordinary conditions.

The starting material is an aqueous medium containing aromatic ingredients of coffee. The aqueous medium may contain only aromatic ingredients of coffee, irrespective of the means by which these ingredients have been dissovled, although it may also contain other elements, especially solids, such as the solids found in coffee for example, aroma strengtheners, agents intended to correct any imbalances, etc. For example, the aromatic coffee ingredients may emanate from the condensation of aromas released during the roasting of green coffee or during the grinding of roasted coffee, or even from the condensation of aromas obtained by the stripping with gases or with steam either of a roasted coffee, in dry form or in suspension in water, or of an aqueous extract of roasted coffee.

As will be seen hereinafter, the aromatic fraction obtained by the process according to the invention is characterised by its remarkable stability. It has been found that this stability is not governed by the type of coffee treated (arabica, robusta, excelsa, santos etc), or by its geographic origin (America, Africa or Asia), or by its degree of roasting or by the concentration of the starting aqueous medium which may vary within wide limits. One convenient measure of the concentration of a condensate obtained by stripping dry roasted coffee with steam is, for example, the stripping level, i.e. the ratio by weight of condensate water to dry starting coffee. This level generally amounts to between 1 and 300%.

The process according to the invention may be carried out in different ways. In a first embodiment, the aqueous medium is extracted in batches. In a second embodiment, the aqueus medium is continuously extracted. Broadly speaking, the extraction techniques are well known. Some of them are mentioned by way of illustration in the following. For example, extraction may be carried out in a stirrer-equipped tank. By virtue of the azeotropic characteristics of the solvent, extraction may also be carried out in an apparatus of the Soxhlet or similar type at the maximum temperature permitted by the solvent. Several variants are possible, including for example recycling of the azeotropic mixture, or cascade extraction in batteries of tanks.

The aromatic ingredients may also be continously extracted, for example by countercurrent circulation of the two liquids.

In cases where extraction is carried out in a tank, relatively stable emulsions can be formed, especially if the aqueous medium containing the aromatic coffee ingredients also contains solids. In this case, simple freezing of the emulsion, followed by return to the starting temperature, is generally sufficient to break the emulsion.

In addition, it has been found that the quantity of azeotropic mixture to be used, measured by the ratio of mixture to aqueous medium, is not a determining factor. Accordingly, it is desirable to use quantities as reduced as possible whilst, at the same time, ensuring correct extraction of the aromatic coffee ingredients. These quantities (by volume) are for example of the order of 0.3 to 3 times the volume of the aqueous medium to be treated for each extraction operation.

So far as concentration of the aromatic fractions is concerned, it may be accomplished by any known method which does not denature them, more especially by distillation of the solvent, the solvent being an azeotropic mixture of low boiling point. In addition, since distillation is carried out at a constant temperature and with a constant composition of the solvent, the degree of concentration of the aromatic fraction is no longer a critical factor. It has been found in practice that the aromatic fraction may be concentrated without damage to a residual solvent content of the order of 5%.

In one preferred embodiment of the process according to the invention, an aqueous medium obtained by the 1 to 300% stripping of ground roasted Colombian arabica coffee or of a mixture of Colombian, Cameroons and Mexican arabica coffee or even of a mixture of Nicaraguan arabica and Angolan robusta coffee, is extracted with the azeotropic mixture. To this end, extraction is carried out in batches, in tanks and in three or four stages, using a total volume of azeotropic mixture equal to approximately 1.5 times the volume of the aqueous medium. Extraction is carried out under atmospheric pressure and at a temperature of approximately 20° C. The aromatic fraction contained in the azeotropic mixture is then concentrated by distilling the azeotropic mixture at atmospheric pressure up to a reduction in the initial volume of the order of 40 to 50 times. The concentrated aromatic fraction collected then contains approximately 10% of residual azeotropic mixture.

It has already been mentioned that, apart from its representative character of the aroma of coffee, the chief characteristic of the aromatic fraction obtained by the process is its exceptional stability. For example, whereas a methylene chloride extract of a stripped coffee aroma, concentrated to a residual solvent content of approximately 20%, only keeps for a few days at −20° C and only for a few more days at −80° C, an otherwise comparable extract obtained with the azeotropic mixture of pentane and methylene chloride keeps for at least one year at a temperature of −20° C. This stability may be demonstrated with precision by chromatographic analyses in the gas phase.

The degree of concentration of the aromatic fraction would not appear to have any effect upon its stability. It is for this reason that most of the azeotropic mixture is generally eliminated by distillation.

The organoleptic quality of the aromatic fractions obtained by the process according to the invention is remarkable although it is influenced by the concentration of the aqueous medium extracted with the azeotropic mixture. Thus, in the case of a medium consisting of a condensate obtained by stripping ground roasted coffee with steam, an optimum quality has been observed for media with stripping levels of from 100 to 150%, i.e. in cases where the ground coffee has been treated with 1 to 1.5 times its weight of steam.

The aromatic fraction thus prepared, concentrated or otherwise, may be used as an aromatising agent either for imparting a coffee aroma to a material from which such an aroma is absent or for strengthening an already existing coffee aroma.

In the first application, known as ab initio aromatisation, the quantities of aromatic fraction to be added to the material to be aromatised and governed by the nature of that material. If this material is neutral from the aromatic point of view, the additions may amount to between 0.5 and 12‰ (per thousand) calculated on the weight of aromatic fraction (without residual solvent), based on the weight of the solids in the material to be treated. Thus, it is possible to aromatise, for example, milk, coffee powders poor in aroma, creams, ice creams, chewing gums, etc. If this material already has an inherent aroma, the additions have to be defined case by case. In general, it is necessary to use proportionally greater quantities to supplant the inherent aroma, although in some cases relatively smaller quantities may prove sufficient as a result of a synergistic effect.

In the second application, namely strengthening an already existing coffee aroma, the quantities of aromatic fraction to be added are appreciably smaller and normally amount to between 1/5th and 1/20th of the quantities required for ab initio aromatisation. For example, in order to strengthen or enhance the aroma of a medium-quality instant coffee, it is sufficient to add from 0.1 to 0.6‰ of aromatic fraction.

In one variant of these two applications, the aromatic fraction is fixed to an "aroma support", for example a salt or a material based on polysaccharides, by any known process. It is this fixed aromatic fraction which is used for aromatisation.

Finally, in order to aromatise coffee solids or to strengthen their coffee aroma, it is possible for example to add the aromatic fraction either directly to a decoction of coffee, to an instnt coffee powder or to the reconstituted instant coffee, or indirectly, i.e. after having fixed the aromatic fraction to coffee oil.

It is preferred to use a concentrated aromatic fraction with a very low residual solvent content, so that there is no need to provide specific means for eliminating the residual solvent in the end product. In this connection, it is pointed out that, even at the higher aromatisation levels such as defined earlier on, the aromatised material does not have any solvent taste.

In one preferred application, the aromatic fraction prepared by the process according to the invention is directly added, after concentration to a residual solvent content of the order of 10%, to coffee solids in a quantity of from 0.35 to 1‰ (as stregthner) and in a quantity of from 3.5 to 10‰ in the case of low-aroma coffee solids.

The following Examples illustrate the process according to the invention and the use of the aromatic fraction prepared by this process. In these Examples, percentages and ratios are expressed in terms of weight.

EXAMPLE 1

A series of aromatic fractions of Colombian arabica coffee is prepared by separately suspending in one liter of water 100 g samples of this coffee, ground and previously roasted at approximately 165° C to a weight loss of the order of 18%, and by subjecting these suspensions to stripping for variable periods. The quantities of condensate collected are measured, being expressed as stripping levels by relating these quantities to the quantities of starting coffee used. Each of these condensates is then treated as follows: extraction with 4 × 25 ml of an azeotropic mixture of pentane (68%) and methylene chloride (32%), combining the 4 volumes or organic phase, drying with anhydrous sodium sulphate and concentration by distillation of the azeotrope at 30° C to a residual solvent content of the order of 10%, evaluated by gas-phase chromatography. The preparation parameters and the characteristics of the concentrated aromatic fractions thus obtained are set out in the following Table, in which the columns represent:

1. stripping times in mins.
2. weight of condensates collected in g = stripping level in %
3. volumes of concentrated aromatic fractions in ml
4. minimal stability

| 1 | 2 | 3 | 4 |
|---|---|---|---|
| 8 | 50 | 1.5 | 6 months |
| 11 | 100 | 1.9 | 1 year |
| 14 | 150 | 2.3 | 1 year |
| 17 | 200 | 2.5 | 6 months |
| 20 | 250 | 2.8 | 6 months |

The corresponding non-concentrated aromatic fractions have a similar stability and, after concentration, give concentrated fractions which have the same characteristics.

In addition, comparable results are obtained from a mixture of 40%, of Colombian arabica, 30% of Cameroon arabica and 30%. of Mexican arabica coffee, or from a mixture of 60% of Nicaraguan arabica and 40%. of Angolan robusta coffee.

Finally, parallel results are obtained from these coffees or coffee mixtures with different degrees of roasting.

EXAMPLES 2 to 5

The tests described in Example 1 are repeated using Colombian arabica coffee and other azeotropic mixtures. The results obtained are set out in the following Table, in which the figures of columns 2 and 3 have the same meaning as in Example 1.

| Examples | Nature and $P_E$ of the azeotropic mixture | | 2 | 3 |
|---|---|---|---|---|
| 2 | pentane 58%, isopropyl chloride 42% | 30.5° C | 100 150 | 1.9 2.3 |
| 3 | pentane 94%, freon 113 6% | 36° C | 100 150 | 1.6 2.0 |
| 4 | pentane 20%, diethyl ether 80% | 32° C | 100 150 | 1.2 1.6 |
| 5 | pentane 34.5%, methylene chloride 3.5%, ether 62% | 33° C | 100 150 | 2.0 2.4 |

In every case, the shelf lives amount to more than 6 months.

Example 6

Aromatic fractions of Colombian arabica coffee are prepared from decoctions obtained by separately treating 100 g samples of this coffee with 1 liter of boiling water. After separation of the grounds, these decoctions are then treated in the same way as in Example 1 (stripping with steam, extraction with the azeotropic mixture of pentane (68%.) and methylene chloride (32%.), etc.). The concentrated aromatic fractions thus prepared have volumes of 1.6 ml (stripping level 100%.) and 1.9 ml (stripping level 150%.). They have a minimum shelf life of 1 year.

EXAMPLE 7

The operations described in Example 6 are repeated using an azeotropic mixture of pentane (20%) and diethyl ether (80%) as solvent. The aromatic fractions prepared have volumes of 1.2 ml (stripping level 100%) and 1.6 ml (stripping level 150%). They keep for a minimum period of 6 months.

EXAMPLE 8

60 kg of Colombian arabica coffee, ground and previously roasted at 165° C to a weight loss of the order or 18%, are treated for 18 minutes with 300 kg of steam superheated to 185° C. After elimination of 100 kg of condensate, 196 kg of an extract with a concentration of dry matter of the order of 11% are obtained. This extract is then stripped with steam for approximately 10 minutes until 9 kg of condensate have been recovered, corresponding to a stripping level of 15%. The operations are then continued in the same way as described in Example 1, using as solvent the azeotropic mixture of pentane (68%) and methylene chloride (32%).

The aromatic fraction (90 ml) obtained after concentration to a residual solvent content of approximately 10% is extremely stable and keeps for at least 6 months without damage.

The results are similar when the aromatic fraction has been prepared using the azeotrope pentane (58%) / isopropyl chloride (42%).

EXAMPLE 9

60 kg of Colombian arabica coffee, ground and previously roasted at 165° C to a weight loss of the order of 18%, are humidified with steam superheated to 185° C, after which this humidified coffee is stripped with steam to a stripping level of approximately 4%, the vapours being condensed by passage through two successive condensers cooled with tepid water (30° C) for the first and with cold water (10° C) for the second. The "cold" condensate with a volume of 1.2 liters is then removed. The operations are then continued in the same way as described in Example 1, using the azeotropic mixture of pentane (68%.) and methylene chloride (32%) as solvent.

The aromatic fraction obtained after concentration to a residual solvent content of 10% is extremely stable. It keeps for at least 6 months without changing.

EXAMPLE 10

A neutral base powder is prepared as follows: a mixture of 3 arabica coffees (Colombian 40%, Cameroon 30% and Mexican 30%), ground and previously roasted at 165° C to a weight loss of the order of 18%, is extracted in the same way as described in Example 8, and the extract thus obtained is subsequently subjected to stripping with steam in order to remove its aroma. Finally, the de-aromatised extract is spray-dried to give the required neutral base powder.

Three 15 g samples of this powder are then removed and have added to them 50 μl (i.e. in round figures 3.5%o), 100 μl (7%o) and 150 μl (10%o), respectively, of the aromatic fraction with a stripping level of 100%. obtained in accordance with Example 1 (pentane/methylene chloride). Three instant coffees are then prepared by dissolving each of these aromatised powders in 1 liter of hot water. The coffees are then submitted to a jury of eight trained tasters who are asked to indicate their preference. The preferred sample is the sammple aromatised to 7%o, qualified as balanced, followed by the sample aromatised to 10%o and then by the sample aromatised to 3.5%o. These samples are generally described as having a highly representative aroma and as being fee from any after taste of the solvent.

Other instant coffees are then prepared in the same way with the aid of the neutral base powder aromatised to 7%o with the aromatic fractions of Example 1 with various stripping levels (50, 150, 200 and 250%). The verdict of the tasters is as follows:

50% fresh aroma, slightly pyrazinic
150% and 100%, balanced
200% "burnt" aroma, too heavy
250% like 200%, "burnt", too heavy.

The results obtained are similar when the neutral base powder used is a freeze-dried powder.

EXAMPLES 11 to 13

The procedure is as described in Example 10, using the aromatic fractions of Examples 6 to 8. The results obtained are set out in the following Table:

| Examples | Aromatic fraction used | Degree of aromatisation in %o | Preferences |
|---|---|---|---|
| 11 | 6 (pentane/methylene chloride) | 3.5<br>7<br>10 | 3<br>1<br>2 |
| 12 | 7 (pentane/diethyl ether) | 3.5<br>7<br>10 | 3<br>2<br>1 |
| 13 | 8 (pentane/methylene chloride and pentane/isopropyl chloride) | 3.5<br>7<br>10 | 2<br>1<br>3 |

EXAMPLE 14

An approximately 50 g/l decoction is prepared from a mixture of 40%. of Brazilian santos coffee, 30% of Colombian arabica coffee and 30% of Salvador arabica coffee. This decoction is stregthened by the addition of 0.7%o (based on the solids) of the aromatic fraction of Example 1 with a stripping level of 100%. According to the tasters, the decoction thus strengthened has much better organoleptic characteristics than the untreated starting decoction, and possesses an extremely intense aroma.

EXAMPLE 15

300 μl (i.e. 2.5%o) of the aromatic fraction of Example 1 with a stripping level of 100% are added to one liter of standard commercial-grade pasteurised milk with a dry matter content of the order of 12%. The beverage thus obtained has an acid taste which, nevertheless, is very similar to that of a coffee containing milk without having its appearance.

EXAMPLE 16

A cream is prepared from 3.5%. of flour, 13% of castor sugar, 2.5% of caramel, 0.02% of vanillin and approximately 80% of pasteurised milk. After cooking, 0.1%o by weight of the aromatic fraction of Example 1 (stripping level 100%) is added. This cream constitutes a very pleasant-tasting coffee-flavored cream.

EXAMPLE 17

An ice cream is prepared from 12% of fresh cream containing 35% of fat, 7% of egg yolk, 12% of sucrose, 3.5%. of 80% glucose syrup, 3.5% of invert sugar (glucose and fructose), 14% of caramel and 48% of whole milk. Before freezing, 0.1%o by weight of the aromatic fraction of Example 1 (stripping level 100%) is added. This coffee-flavored ice cream is highly rated by the tasters.

I claim:

1. A process for isolating an aromatic coffee fraction from an aqueous medium containing said fraction which comprises contacting the aqueous medium with an organic solvent which is an azeotrope mixture having a boiling point below about 50° C and which is selected from the group consisting of

| | |
|---|---|
| pentane/methylene chloride and | 68 –32% |
| pentane/freon 113 (trichlorotrifluorethane) | 94 –6% | and recovering a solvent phase containing the aromatic fraction which is then concentrated by distillation.

2. A process as claimed in claim 1, wherein the recovered solvent phase is concentrated to a residual solvent content of the order of 10%.

3. A process as claimed in claim 1, wherein the aqueous medium is an extract of roasted coffee.

4. A process as claimed in claim 1, wherein the aqueous medium is a condensate of the aroma given off during the roasting of green coffee or during the grinding of roasted coffee.

5. A process as claimed in claim 1, wherin the aqueous medium is a stripped aroma condensate of roasted coffee.

6. A process as claimed in claim 5, wherein the aqueous medium is a condensate obtained by stripping of roasted coffee at a stripping level of from 1% to 300%.

7. A process as claimed in claim 1, wherein extraction is carried out at a temperature in the range from 20° to 30° C.

8. A process as claimed in claim 1, wherein extraction is carried out at the boiling temperature of the azeotropic mixture used.

9. An aromatic coffee fraction obtained by the process claimed in claim 1, having a stability at −20° C of at least 6 months.

* * * * *